United States Patent
Ishida

(10) Patent No.: US 7,554,385 B2
(45) Date of Patent: Jun. 30, 2009

(54) CHARGE PUMP CIRCUIT AND ELECTRIC APPLIANCE THEREWITH

(75) Inventor: Takuya Ishida, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 97 days.

(21) Appl. No.: 11/654,225

(22) Filed: Jan. 16, 2007

(65) Prior Publication Data

US 2007/0176671 A1    Aug. 2, 2007

(30) Foreign Application Priority Data

Jan. 27, 2006 (JP) .......................... 2006-018538
Jan. 27, 2006 (JP) .......................... 2006-018539

(51) Int. Cl.
    *G05F 1/575*     (2006.01)
    *H02M 3/18*     (2006.01)
    *H03K 17/16*     (2006.01)

(52) U.S. Cl. .................. 327/536; 327/170; 363/60

(58) Field of Classification Search ............... None
See application file for complete search history.

(56) References Cited

U.S. PATENT DOCUMENTS

| | | | |
|---|---|---|---|
| 6,744,224 B2* | 6/2004 | Ishii | 315/291 |
| 7,009,857 B2* | 3/2006 | Chen et al. | 363/60 |
| 7,224,591 B2* | 5/2007 | Kaishita et al. | 363/60 |
| 7,250,810 B1* | 7/2007 | Tsen et al. | 327/536 |
| 7,365,585 B2* | 4/2008 | Fort et al. | 327/170 |
| 2008/0157843 A1* | 7/2008 | Young | 327/261 |

FOREIGN PATENT DOCUMENTS

JP     2005-057969     3/2005

* cited by examiner

*Primary Examiner*—Lincoln Donovan
*Assistant Examiner*—Terry L Englund
(74) *Attorney, Agent, or Firm*—Fish & Richardson P.C.

(57) ABSTRACT

In a charge pump circuit, the slew rate at which a clock signal is fed to charge transfer transistors is changed according to the output voltage. This configuration helps alleviate rush currents at start-up without unduly lowering efficiency.

6 Claims, 10 Drawing Sheets

THE HIGHER THE SLEW RATE, THE BETTER THE CHARACTERISTICS.

RUSH CURRENTS

CHARGE PUMP CIRCUIT AND ELECTRIC APPLIANCE THEREWITH

This application claims priority based on the following Japanese Patent Applications, the contents of both of which are hereby incorporated by reference:

(1) Japanese Patent Application No. 2006-018538, filed on Jan. 27, 2006; and
(2) Japanese Patent Application No. 2006-018539, filed on Jan. 27, 2006;

BACKGROUND OF THE INVENTION

1. Field of the Invention

The present invention relates to a charge pump circuit that produces a desired output voltage from an input voltage by turning on and off a plurality of charge transfer transistors periodically according to a clock signal and thereby charging and discharging a charge accumulation capacitor; the present invention also relates to an electric appliance provided with such a charge pump circuit.

2. Description of Related Art

FIG. 9 is a circuit diagram of an example of a conventional charge pump circuit. The charge pump circuit shown in the figure is so configured as to produce from an input voltage $V_i$ a desired output voltage $V_o$ ($\geq V_i$) by turning on and off a plurality of charge transfer transistors Q1 to Q4 periodically according to a clock signal CLK (and an inverted clock signal CLKB) and thereby charging and discharging a charge accumulation capacitor C1. The output voltage $V_o$ can be set freely in the range of $-V_i \leq V_o \leq 0$.

Now, how this circuit outputs a negative voltage will be described specifically. To produce the output voltage $V_o$, first the transistors Q1 and Q3 are turned on, while the transistors Q2 and Q4 are left off. As a result of this switching, the input voltage $V_i$ is applied through the transistor Q1 to one terminal (point A) of the capacitor C1; the other terminal (point B) of the capacitor C1 is grounded through the transistor Q3. This causes the capacitor C1 to be charged until the potential difference across it becomes equal to the input voltage $V_i$.

After the capacitor C1 is completely charged, now the transistors Q1 and Q3 are turned off, and the transistors Q2 and Q4 are turned on. As a result of this switching, point A is grounded through the transistor Q2. This causes the potential at point A to fall from the input voltage $V_i$ down to the ground voltage GND. Here, as a result of the previous charging of the capacitor C1, a potential difference substantially equal to the input voltage $V_i$ is present across the capacitor C1, and therefore, when the above-mentioned fall occurs in the potential at point A, the potential at point B falls from the ground voltage GND down to a negative voltage $-V_i$. Here, point B is conducting through the transistor Q4 to an output voltage extraction terminal, and thus the charge in the capacitor C1 moves to an output capacitor Co, causing the potential at the output voltage extraction terminal to fall down to the negative voltage $-V_i$.

A generally recognized disadvantage with the conventional charge pump circuit described above is the occurrence of rush currents that flow into the capacitor C1 at start-up (see FIG. 10). For this reason, in the charge pump circuit described above, device breakdown and excessive heat generation that may result from rush currents need to be prevented by the use of high-capacity transistors as Q1 to Q4. This counts as a factor hampering chip area reduction. As another disadvantage, the charge pump circuit needs to be fabricated by a process whose latch-up characteristics have been verified with large current. This unnecessarily limits the choice of feasible fabrication processes. As a further disadvantage, in a system involving a high-impedance power supply network, such as in a negative power supply in a hard disk drive, the occurrence of rush currents results in an insufficient supply voltage to the target appliance, making its operation unstable.

As a solution to these disadvantages, there have conventionally been proposed charge pump circuits in which rush currents into a capacitor are prevented by the use of a constant current circuit (for example, see JP-A-2005-057969).

Certainly, the conventional technology disclosed in JP-A-2005-057969 helps alleviate rush currents that occur at start-up.

Disadvantageously, however, this conventional technology requires provision of a constant current circuit in addition to charge transfer transistors Q1 to Q4 in the current path through the charge pump circuit. This increases the on-state resistance of the circuit as a whole, resulting in lower efficiency.

SUMMARY OF THE INVENTION

An object of the present invention is to provide a charge pump circuit that can, without lowering efficiency, alleviate rush currents occurring at start-up, and to provide an electric appliance provided with such a charge pump circuit.

To achieve the above object, according to one aspect of the invention, a charge pump circuit is provided with: a plurality of charge transfer transistors that are turned on and off periodically according to a clock signal; a charge accumulation capacitor that is charged and discharged as the charge transfer transistors are turned on and off so as to produce a desired output voltage from an input voltage; a slew rate changer portion that changes the slew rate at which the clock signal is fed to the charge transfer transistors; and a controller portion that controls the slew rate changer portion to change the slew rate according to the level of the output voltage. Here, the controller portion gives instructions to the slew rate changer portion to increase the slew rate as the output voltage approaches a target voltage level.

According to another aspect of the invention, a charge pump circuit is provided with: a plurality of charge transfer transistors that are turned on and off periodically according to a clock signal; a charge accumulation capacitor that is charged and discharged as the charge transfer transistors are turned on and off so as to produce a desired output voltage from an input voltage; a current mirror circuit including a pair of transistors, the current mirror circuit mirroring a constant current flowing through one transistor to make the other transistor output a mirrored current; and a controller portion that controls whether or not to permit the driving of the current mirror circuit according to the level of the output voltage. Here, the first of the charge transfer transistors that is connected between one terminal of the charge accumulation capacitor and an input voltage application terminal and that is brought into an on state when the charge accumulation capacitor is charged is used as the mirrored current output side transistor of the current mirror circuit. Moreover, the controller portion permits the driving of the current mirror circuit until the output voltage reaches a predetermined threshold voltage so as to turn the current mirror circuit on and off periodically according to the clock signal, and the controller portion prohibits the driving of the current mirror circuit after the output voltage has reached the predetermined threshold voltage so as to turn the first transistor on and off directly according to the clock signal.

DETAILED DESCRIPTION OF PREFERRED EMBODIMENTS

Figure 1:
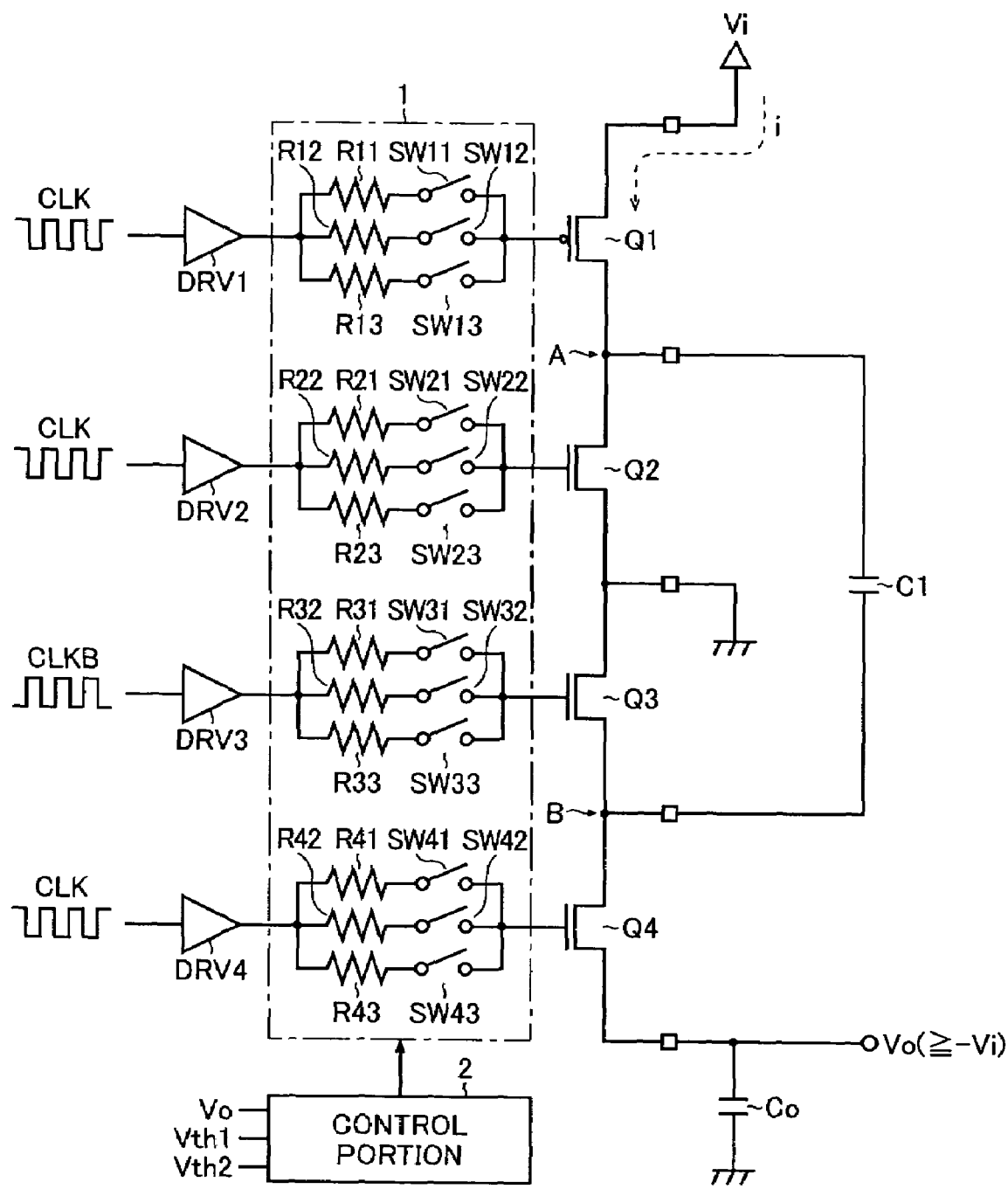
FIG. 1 is a circuit diagram of a charge pump circuit as a first embodiment of the invention.

FIG. 1 is a circuit diagram (partly a block diagram) of a charge pump circuit as a first embodiment of the invention.

As the figure shows, the charge pump circuit of this embodiment includes, as charge transfer transistors, a P-channel field-effect transistor Q1 and N-channel field-effect transistors Q2 to Q4. The charge pump circuit is configured as a negative-voltage-output charge pump circuit that produces from an input voltage Vi a desired output voltage Vo ($\geq$ –Vi) by turning on and off the charge transfer transistors Q1 to Q4 periodically according to a clock signal CLK (and an inverted clock signal CLKB) and thereby charging and discharging a charge accumulation capacitor C1. The output voltage Vo can be set freely in the range of –Vi$\leq$Vo$\leq$0 through an unillustrated feedback circuit.

The clock signal CLK and the inverted clock signal CLKB are not the perfect inversions of each other, but are generally so prepared that they shift their logical levels with different timing from each other. This is to prevent an input voltage application terminal and an output voltage extraction terminal from being short-circuited to ground (as a result of the transistors Q1 and Q2 being turned on simultaneously, or the transistors Q3 and Q4 being turned on simultaneously).

The source of the transistor Q1 is connected to the input voltage application terminal. The drain of the transistor Q1 is connected to one terminal (point A) of the capacitor C1. The gate of the transistor Q1 is connected to a clock signal CLK application terminal through a slew rate changer portion 1—described later—and a driver DRV 1. Thus, the transistor Q1 acts as switching means for opening and closing the connection path between the input voltage Vi application terminal and the one terminal (point A) of the capacitor C1 according to the clock signal CLK.

The source of the transistor Q2 is connected to the one terminal (point A) of the capacitor C1. The drain of the transistor Q2 is connected to a ground terminal. The gate of the transistor Q2 is connected to the clock signal CLK application terminal through the slew rate changer portion 1 and a driver DRV2. Thus, the transistor Q2 acts as switching means for opening and closing the connection path between the ground terminal and the one terminal (point A) of the capacitor C1 according to the clock signal CLK.

The source of the transistor Q3 is connected to the ground terminal. The drain of the transistor Q3 is connected to the other terminal (point B) of the capacitor C1. The gate of the transistor Q3 is connected to a inverted clock signal CLKB application terminal through the slew rate changer portion 1 and a driver DRV3. Thus, the transistor Q3 acts as switching means for opening and closing the connection path between the ground terminal and the other terminal (point B) of the capacitor C1 according to the inverted clock signal CLKB.

The drain of the transistor Q4 is connected to the other terminal (point B) of the capacitor C1. The source of the transistor Q4 is connected to the ground terminal through an output capacitor Co, and is also connected to the output voltage extraction terminal. The gate of the transistor Q4 is connected to the clock signal CLK application terminal through the slew rate changer portion 1 and a driver DRV4. Thus, the transistor Q4 acts as switching means for opening and closing the connection path between the output voltage extraction terminal and the other terminal (point B) of the capacitor C1 according to the clock signal CLK.

Now, how the charge pump circuit configured as described above outputs a negative voltage will be described specifically. To output the output voltage Vo, first the transistors Q1 and Q3 are turned on, while the transistors Q2 and Q4 are left off. As a result of this switching, the input voltage Vi is applied through the transistor Q1 to one terminal (point A) of the capacitor C1; the other terminal (point B) of the capacitor C1 is grounded through the transistor Q3. This causes the capacitor C1 to be charged until the potential difference across it becomes equal to the input voltage Vi.

After the capacitor C1 is completely charged, now the transistors Q1 and Q3 are turned off, and the transistors Q2 and Q4 are turned on. As a result of this switching, point A is grounded through the transistor Q2. This causes the potential at point A to fall from the input voltage Vi down to the ground voltage GND. Here, as a result of the previous charging of the capacitor C1, a potential difference substantially equal to the input voltage Vi is present across the capacitor C1, and therefore, when the above-mentioned fall occurs in the potential at point A, the potential at point B falls from the ground voltage GND down to a negative voltage –Vi. Here, point B is conducting through the transistor Q4 to an output voltage extraction terminal, and thus the charge in the capacitor C1 moves to an output capacitor Co, causing the potential at the output voltage extraction terminal to fall down to the negative voltage –Vi.

In this way, the charge pump circuit of this embodiment produces from the input voltage Vi the desired output voltage Vo ($\geq$ –Vi) by repeatedly charging and discharging the capacitor C1.

The charge pump circuit of this embodiment further includes, in addition to the charge transfer transistors Q1 to Q4 and the capacitor C1, a slew rate changer portion 1 that changes the slew rate at which the clock signal CLK (and the inverted clock signal CLKB) is fed to the charge transfer transistors Q1 to Q4, and a controller portion 2 that controls the slew rate according to the level of the output voltage Vo.

The slew rate changer portion 1 has, connected to the gate of each of the charge transfer transistors Q1 to Q4, variable resistance means whose resistance is varied according to instructions from the controller portion 2. The variable resistance means has, connected in parallel with one another, a plurality of serial circuits each composed of a resistor and a switch, and this switch is opened and closed according to the instructions from the controller portion 2.

More specifically, between the output terminal of the driver DRV1 and the gate of the transistor Q1, there are connected, as the corresponding variable resistance means belonging to the slew rate changer portion 1, a first serial circuit composed of a resistor R11 and a switch SW11, a second serial circuit composed of a resistor R12 and a switch SW12, and a third serial circuit composed of a resistor R13 and a switch SW13 in parallel with one another.

Likewise, for the transistors Q2 to Q4, there are connected, as the corresponding variable resistance means belonging to the slew rate changer portion 1, resistors and switches as shown in the figure. Specifically, for the transistor Q2, there are connected, as the corresponding variable resistance means, resistors R21 to R23 and switches SW21 to SW23; for the transistor Q3, there are connected, as the corresponding variable resistance means, resistors R31 to R33 and switches SW31 to SW33; and, for the transistor Q4, there are connected, as the corresponding variable resistance means, resistors R41 to R43 and switches SW41 to SW43.

Now, how the charge pump circuit configured as described above changes the slew rate will be described in detail with reference to FIG. 2 as well as FIG. 1.

Figure 2:
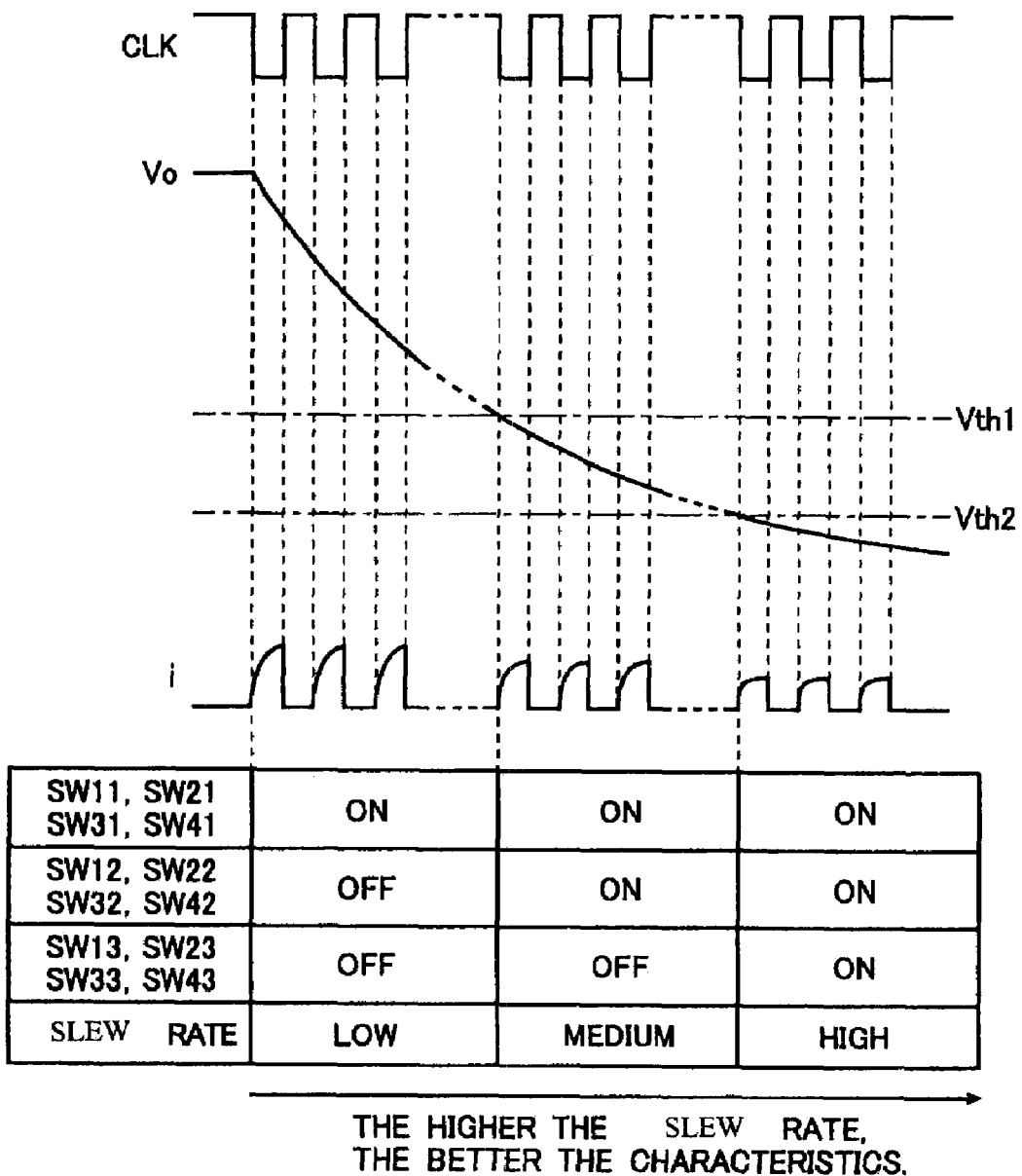
FIG. 2 is a diagram showing an example of control whereby a slew rate is changed.

FIG. 2 is a diagram showing an example of the control whereby the slew rate is changed. In the figure, the symbols "CLK", "Vo", and "i" respectively indicate the behavior of the clock signal CLK, the output voltage Vo, and the current i that flows into the capacitor C1. Shown together in the figure is the operation status of the slew rate changer portion 1.

As FIG. 2 shows, immediately after power-up, according to instructions from the controller portion 2, of all the switches provided in the slew rate changer portion 1, the switches SW11, SW21, SW31, and SW4 are turned on, while all the other switches are left off. This maximizes the gate resistances of the charge transfer transistors Q1 to Q4, causing the slew rate to be set at its slowest. Thus, rush currents at start-up can be alleviated effectively.

Thus, with the charge pump circuit of this embodiment, there is no need to unduly increase the current capacity of the charge transfer transistors Q1 to Q4, and this makes chip area reduction possible. Moreover, with the charge pump circuit of this embodiment, a margin can be secured in, for example, latch-up characteristics with large current, and this widens the choice of feasible fabrication processes. Moreover, incorporating the charge pump circuit of this embodiment as a negative power supply in an electric appliance (for example, a hard disk drive) helps enhance its operation stability at start-up.

From the perspective of the characteristics of the charge pump circuit, however, the slew rate should be as high as possible, and therefore the gate resistances of the charge transfer transistors Q1 to Q4 should be kept low in normal operation. Abruptly reducing the gate resistances of the charge transfer transistors Q1 to Q4, however, causes an abrupt rise in the current i into the capacitor C1, curtailing the significance of alleviating rush currents.

To avoid this, in the charge pump circuit of this embodiment, the controller portion 2 gives instructions to the slew rate changer portion 1 to increase the slew rate as the output voltage Vo approaches its target voltage level.

More specifically, when the output voltage Vo falls down to a first predetermined threshold voltage Vth1, the controller portion 2 instructs the slew rate changer portion 1 to turn, of all the switches provided therein, the switches SW11 and SW12, SW21 and SW22, SW31 and SW32, and SW41 and SW42 on and all the other switches off. When the output voltage Vo falls further down to a second predetermined threshold voltage below the first threshold voltage, the controller portion 2 instructs the slew rate changer portion 1 to turn all the switches provided therein on.

In this way, while the level of the output voltage Vo is monitored, the gate resistances of the charge transfer transistors Q1 to Q4 are reduced stepwise, that is, the slew rate is increased stepwise. With this configuration, it is possible to reduce the maximum level of the current through the charge pump circuit without changing the characteristics thereof in normal operation.

The invention may be practiced otherwise than specifically described above as an embodiment, with many modifications and variations made within the spirit of the invention.

Figure 3:
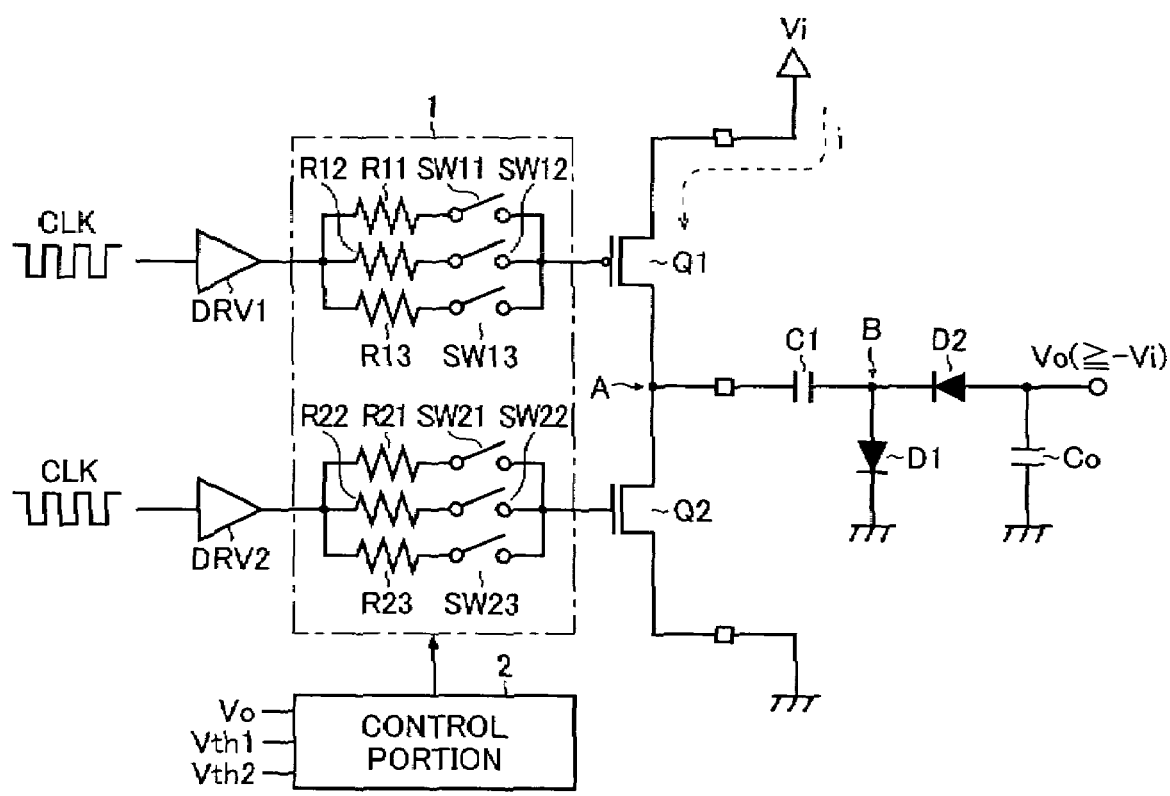
FIG. 3 is a circuit diagram of a charge pump circuit as a second embodiment of the invention.

For example, as shown in FIG. 3, the transistors Q3 and Q4 may be replaced with diodes D1 and D2 (a second embodiment).

The variable resistance means in the slew rate changer portion 1 may alternatively be realized with switched capacitors or the like.

Figure 4:
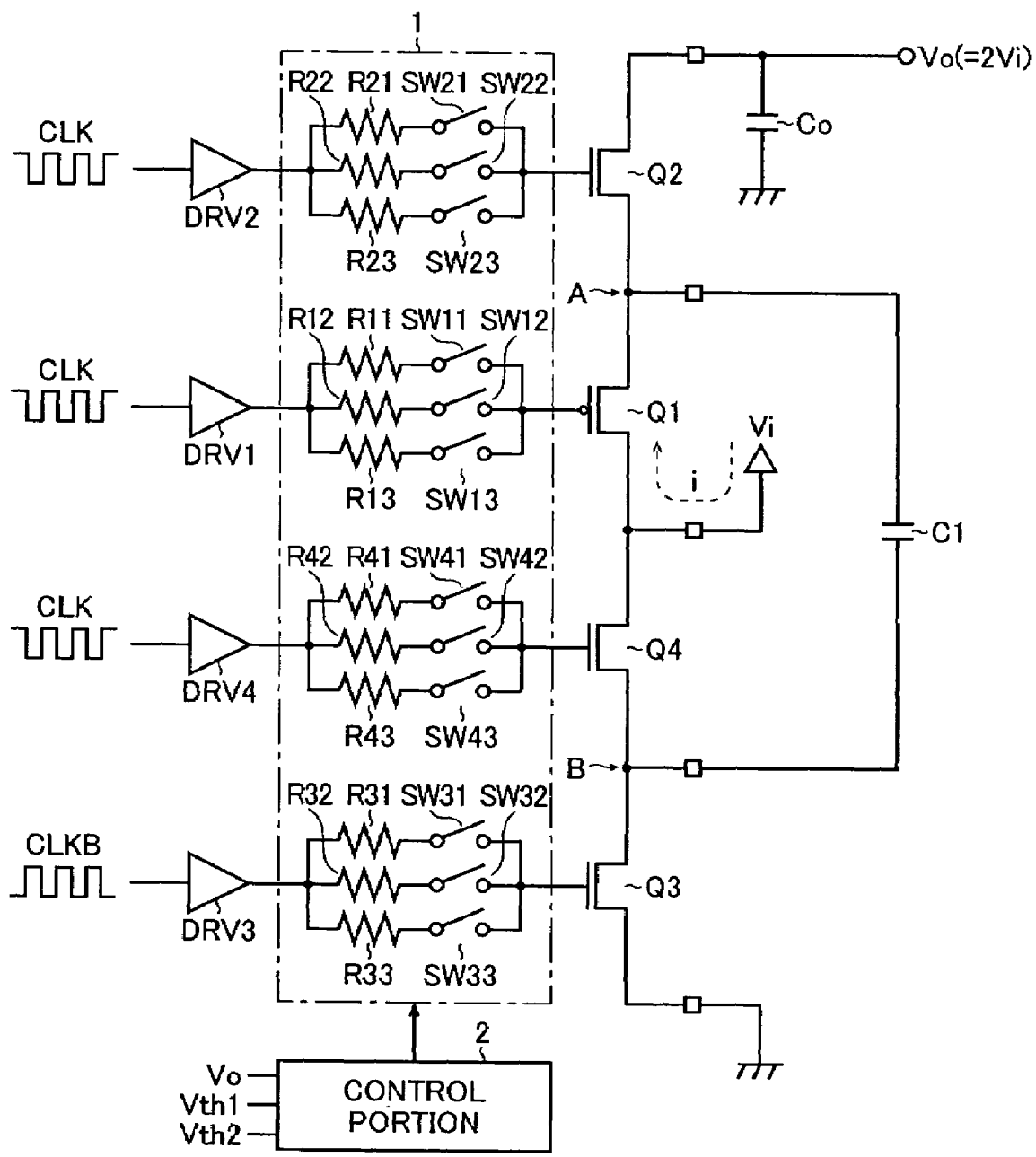
FIG. 4 is a circuit diagram of a charge pump circuit as a third embodiment of the invention.

The embodiment described above deals with a case where the invention is applied to a negative-voltage-output charge pump circuit. The invention, however, may be applied to any other configuration, for example to a positive step-up charge pump circuit (a third embodiment) as shown in FIG. 4.

Figure 5:
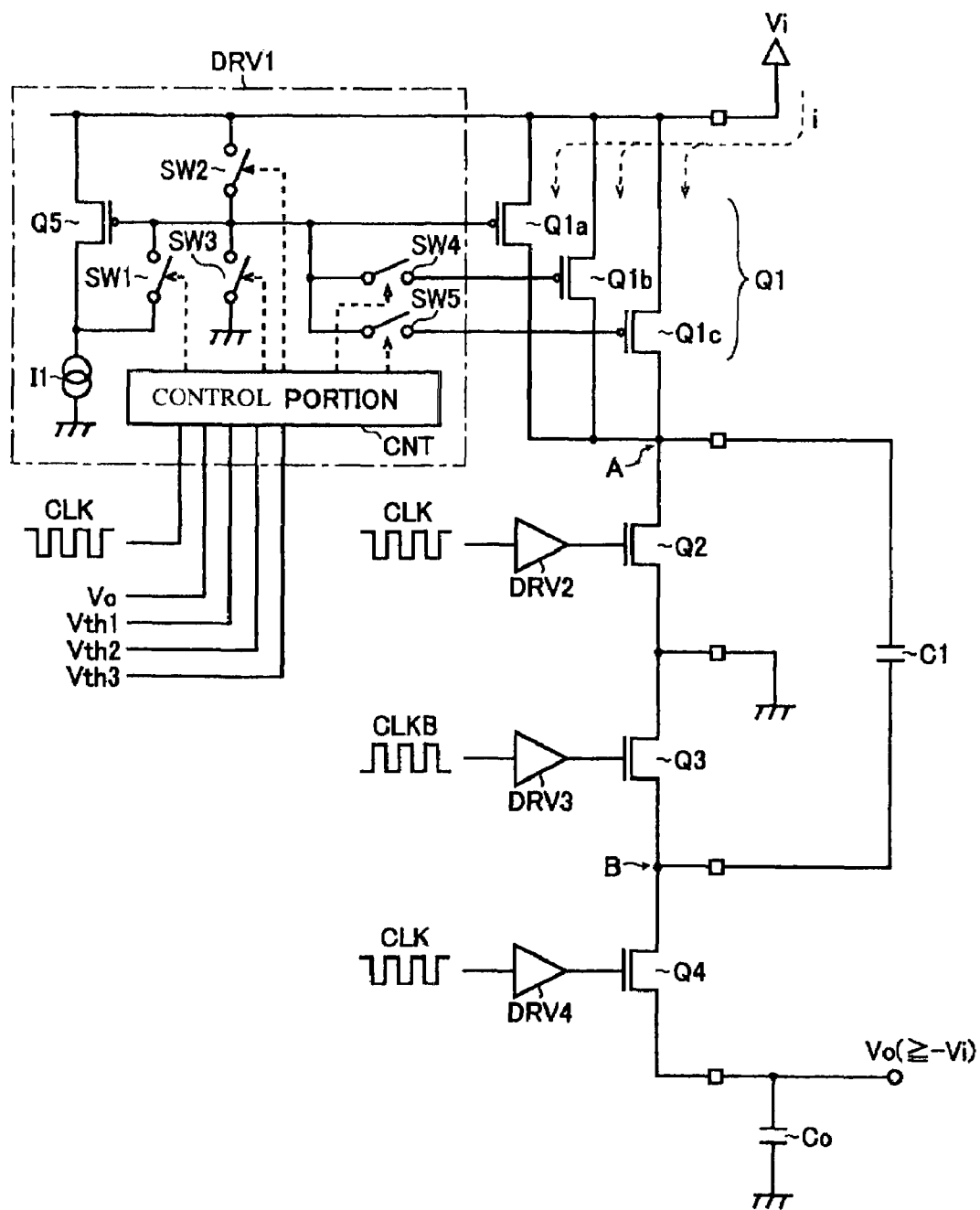
FIG. 5 is a circuit diagram of a charge pump circuit as a fourth embodiment of the invention.

FIG. 5 is a circuit diagram (partly a block diagram) of a charge pump circuit as a fourth embodiment of the invention.

As the figure shows, the charge pump circuit of this embodiment includes, as charge transfer transistors, P-channel field-effect transistors Q1a to Q1c and N-channel field-effect transistors Q2 to Q4. The charge pump circuit is configured as a negative-voltage-output charge pump circuit that produces from an input voltage Vi a desired output voltage Vo ($\geq$ –Vi) by turning on and off the charge transfer transistors Q1a to Q1c and Q2 to Q4 periodically according to a clock signal CLK (and an inverted clock signal CLKB) and thereby charging and discharging a charge accumulation capacitor C1. The output voltage Vo can be set freely in the range of –Vi$\leq$Vo$\leq$0 through an unillustrated feedback circuit.

The clock signal CLK and the inverted clock signal CLKB are not the perfect inversions of each other, but are generally so prepared that they shift their logical levels with different timing from each other. This is to prevent an input voltage application terminal and an output voltage extraction terminal from being short-circuited to ground (as a result of the transistors Q1a to Q1c and Q2 being turned on simultaneously, or the transistors Q3 and Q4 being turned on simultaneously).

The sources of the transistors Q1a to Q1c are all connected to the input voltage Vi application terminal. The drains of the transistors Q1a to Q1c are all connected to one terminal (point A) of the capacitor C1. The gates of the transistors Q1a to Q1c are all connected to a clock signal CLK application terminal through a driver DRV1. Thus, the transistors Q1a to Q1c each act as switching means for opening and closing the connection path between the input voltage Vi application terminal and the one terminal (point A) of the capacitor C1 according to the clock signal CLK. Put another way, the switching means that is brought into an on state when the capacitor C1 is charged is divided into transistors (division transistors) Q1a to Q1c that are connected in parallel with one another. Put yet another way, together the transistors Q1a to Q1c that are connected in parallel with one another constitute one multiple-gate transistor. In the following description, these Q1a to Q1c are collectively called the transistor Q1 wherever convenient.

In this way, in the charge pump circuit of this embodiment, the transistor Q1 is divided into transistors (division transistors) Q1a to Q1c that are connected in parallel with one another. With this configuration, according to which of the transistors Q1a to Q1c is driven when the capacitor C1 is charged, the on-state resistance of the transistor Q1 as it exhibits when the capacitor C1 is charged can be changed appropriately. How the on-state resistance of the transistor Q1 is changed will be described in detail below.

The source of the transistor Q2 is connected to the one terminal (point A) of the capacitor C1. The drain of the transistor Q2 is connected to a ground terminal. The gate of the transistor Q2 is connected to the clock signal CLK application terminal through a driver DRV2. Thus, the transistor Q2 acts as switching means for opening and closing the connection path between the ground terminal and the one terminal (point A) of the capacitor C1 according to the clock signal CLK.

The source of the transistor Q3 is connected to the ground terminal. The drain of the transistor Q3 is connected to the other terminal (point B) of the capacitor C1. The gate of the transistor Q3 is connected to a inverted clock signal CLKB application terminal through a driver DRV3. Thus, the transistor Q3 acts as switching means for opening and closing the connection path between the ground terminal and the other terminal (point B) of the capacitor C1 according to the inverted clock signal CLKB.

The drain of the transistor Q4 is connected to the other terminal (point B) of the capacitor C1. The source of the transistor Q4 is connected to the ground terminal through an output capacitor Co, and is also connected to the output voltage extraction terminal. The gate of the transistor Q4 is connected to the clock signal CLK application terminal through a driver DRV4. Thus, the transistor Q4 acts as switching means for opening and closing the connection path between the output voltage extraction terminal and the other terminal (point B) of the capacitor C1 according to the clock signal CLK.

Now, how the charge pump circuit configured as described above outputs a negative voltage will be described specifically. To output the output voltage Vo, first the transistors Q1 and Q3 are turned on, while the transistors Q2 and Q4 are left off. As a result of this switching, the input voltage Vi is applied through the transistor Q1 to one terminal (point A) of the capacitor C1; the other terminal (point B) of the capacitor C1 is grounded through the transistor Q3. This causes the capacitor C1 to be charged until the potential difference across it becomes equal to the input voltage Vi.

After the capacitor C1 is completely charged, now the transistors Q1 and Q3 are turned off, and the transistors Q2 and Q4 are turned on. As a result of this switching, point A is grounded through the transistor Q2. This causes the potential at point A to fall from the input voltage Vi down to the ground voltage GND. Here, as a result of the previous charging of the capacitor C1, a potential difference substantially equal to the input voltage Vi is present across the capacitor C1, and therefore, when the above-mentioned fall occurs in the potential at point A, the potential at point B falls from the ground voltage GND down to a negative voltage −Vi. Here, point B is conducting through the transistor Q4 to an output voltage extraction terminal, and thus the charge in the capacitor C1 moves to an output capacitor Co, causing the potential at the output voltage extraction terminal to fall down to the negative voltage −Vi.

In this way, the charge pump circuit of this embodiment produces from the input voltage Vi the desired output voltage Vo ($\geq$−Vi) by repeatedly charging and discharging the capacitor C1.

As shown in the figure, in the charge pump circuit of this embodiment, the driver DRV1 that feeds the clock signal CLK to the transistor Q1 includes a P-channel field-effect transistor Q5, a constant current source I1, a control portion CNT, and switches SW1 to SW5.

The source of the transistor Q5 is connected to the input voltage application terminal. The drain of the transistor Q5 is connected through the constant current source I1 to the ground terminal. The gate of the transistor Q5 is connected to the gate of the transistor Q1a.

One terminal of the switch SW1 is connected to the gates of the transistors Q1a and Q5. The other terminal of the switch SW1 is connected to the drain of the transistor Q5. One terminal of the switch SW2 is connected to the input voltage application terminal. The other terminal of the switch SW2 is connected to the gates of the transistors Q1a and Q5. One terminal of the switch SW3 is connected to the gates of the transistors Q1a and Q5. The other terminal of the switch SW3 is connected to the ground terminal. One terminal of the switch SW4 is connected to the gates of the transistors Q1a and Q5. The other terminal of the switch SW4 is connected to the gate of the transistor Q1b. One terminal of the switch SW5 is connected to the gates of the transistors Q1a and Q5. The other terminal of the switch SW5 is connected to the gate of the transistor Q1c.

As described above, in this embodiment, the driver DRV1 has a current mirror circuit that includes a pair of transistors Q5 and Q1 in order to mirror a constant current flowing through the transistor Q5 to make the transistor Q1 output a mirrored current. That is, of the charge transfer transistors Q1 to Q4, the one, namely the transistor Q1, that is connected between one terminal of the charge accumulation capacitor C1 and the input voltage application terminal and that is brought into an on-state when the charge accumulation capacitor C1 is charged is used as the mirrored current output side transistor of the current mirror circuit.

With this configuration, during constant current control at start-up, which is achieved as will be described later, there is no separate constant current circuit other than the charge transfer transistors Q1 to Q4 in the current path through the charge pump circuit. This helps avoid undue lowering of efficiency without inviting an undue increase in the on-state resistance of the circuit as a whole.

On the other hand, the control portion CNT serves to control whether or not to permit the driving of the current mirror circuit (to change the constant current), and to change the on-state resistance of the transistor Q1.

Now, how the charge pump circuit configured as described above changes the constant current and the on-state resistance will be described in detail with reference to FIG. 6 as well as FIG. 5.

Figure 6:
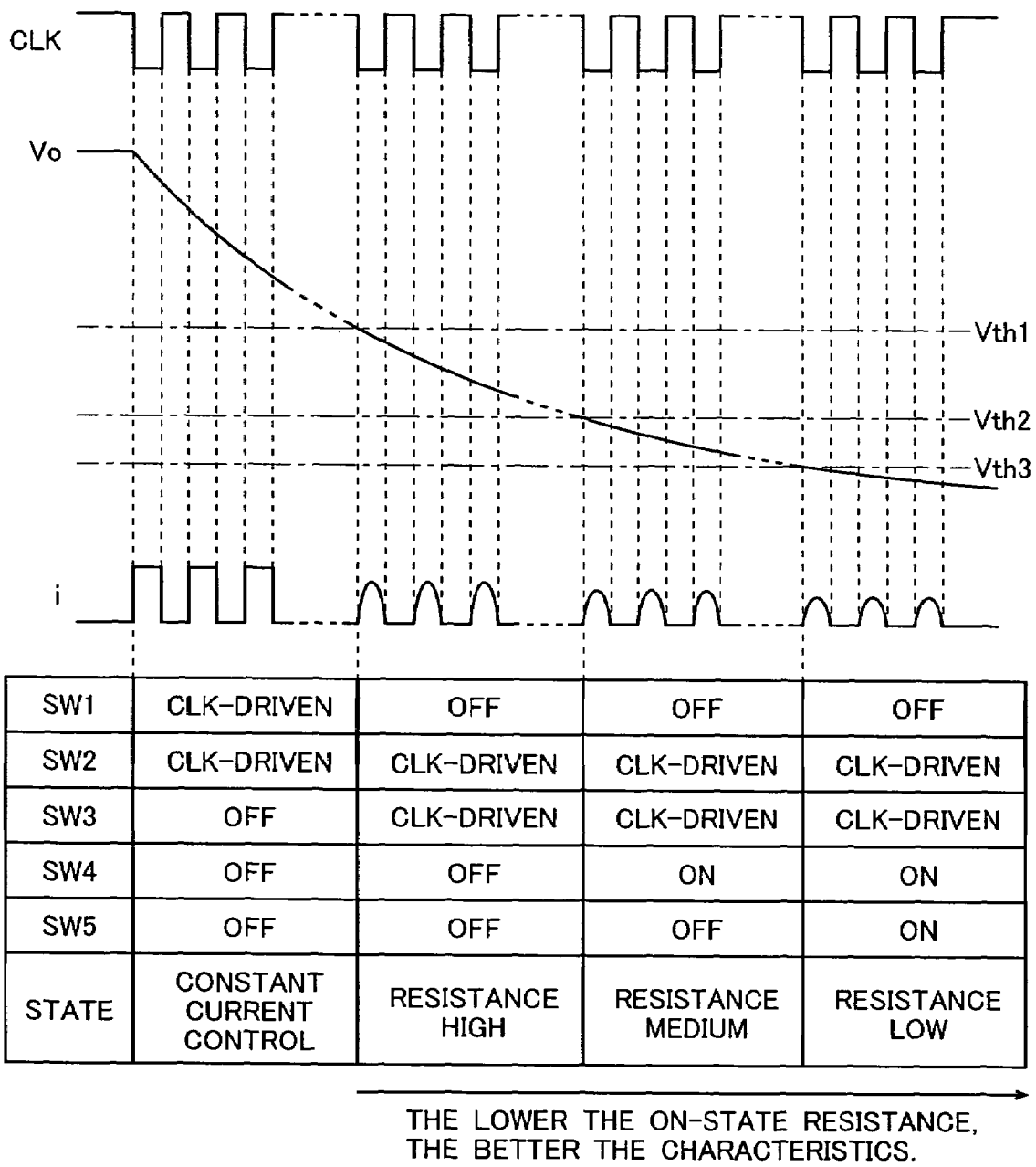
FIG. 6 is a diagram showing an example of control whereby a constant current and an on-state resistance are changed.

FIG. 6 is a diagram showing an example of control whereby the constant current and the on-state resistance are changed. In the figure, the symbols "CLK", "Vo", and "i" respectively indicate the behavior of the clock signal CLK, the output voltage Vo, and the current i that flows into the capacitor C1. Shown together in the figure are whether the switches SW1 to SW5 are respectively in an on or off state, whether the constant current control is in operation, and what on-state resistance the transistor Q1 has.

As FIG. 6 shows, during the period from start-up until the output voltage Vo reaches a first predetermined threshold voltage Vth1, the control portion CNT permits the driving of the current mirror circuit so as to turn it on and off periodically according to the clock signal CLK. Meanwhile, to maximize the on-state resistance of the transistor Q1, the control portion CNT permits the driving of the transistor Q1a alone, and prohibits the driving of the other transistors Q1b and Q1c.

More specifically, during this period, the control portion CNT keeps, of all the switches provided in the driver DRV1, the switches SW3 to SW5 off, and turns the switches SW1 and SW2 on and off complementarily according to the clock signal CLK.

In this way, through the constant current control by the current mirror circuit, the current i that flows in via the input voltage application terminal during the charging of the capacitor C1 is restricted within a predetermined upper limit (the mirrored current of the current mirror circuit). This effectively alleviates rush currents at start-up.

Thus, with the charge pump circuit of this embodiment, there is no need to unduly increase the current capacity of the charge transfer transistors Q1 to Q4, and this makes chip area reduction possible. Moreover, with the charge pump circuit of this embodiment, a margin can be secured in, for example, latch-up characteristics with large current, and this widens the choice of feasible fabrication processes. Moreover, incorporating the charge pump circuit of this embodiment as a negative power supply in an electric appliance (for example, a hard disk drive) helps enhance its operation stability at start-up.

Through the control of the on-state resistance of the transistor Q1 described below alone, it impossible to alleviate rush currents at start-up. The on-state resistances of the transistors Q1a to Q1c, however, contain variations ascribable to their fabrication process, and therefore it is advisable not to rely on the control of the on-state resistance of the transistor Q1 alone but to combine it with the constant current control described above at least immediately after start-up, when the risk of rush currents is high.

From the perspective of making the most of the current capacity of the transistor Q1, however, the constant current control described above should better not be performed. Thus, as soon as it is confirmed that the risk of rush currents has reduced below a certain level, the constant current control should be stopped so that thereafter the control of the on-state resistance of the transistor Q1 alone is performed.

Accordingly, in the charge pump circuit of this embodiment, after the output voltage Vo has reached the first threshold voltage Vth1, the control portion CNT prohibits the driving of the current mirror circuit so as to turn the transistor Q1 on and off directly according to the clock signal CLK. Here, during the period until the output voltage Vo falls further down to a second predetermined threshold voltage Vth2 below the first threshold voltage Vth1, to maximize the on-state resistance of the transistor Q1, the control portion CNT, as it did previously, permits the driving of the transistor Q1a alone, and prohibits the driving of the other transistors Q1b and Q1c.

More specifically, during this period, the control portion CNT keeps, of all the switches provided in the driver DRV1, the switches SW1, SW4, and SW5 off, and turns the switches SW2 and SW3 on and off complementarily according to the clock signal CLK.

In this way, once the risk of rush currents has reduced below a certain level, the previously described restriction ascribable to the constant current control is removed, and this makes it possible to make the most of the current capacity of the transistor Q1.

From the perspective of the characteristics of the charge pump circuit, the on-state resistance of the transistor Q1 should be as low as possible. Thus, in normal operation, the on-state resistance of the transistor Q1 should be kept low. Abruptly reducing the on-state resistance of the transistor Q1, however, causes an abrupt rise in the current i into the capacitor C1, curtailing the significance of alleviating rush currents.

To avoid this, in the charge pump circuit of this embodiment, the controller portion 2 controls whether or not to permit the driving of the transistors Q1a to Q1c individually so that, as the output voltage Vo approaches the target voltage level, an increasing number of the transistors Q1a to Q1c are driven and hence the on-state resistance of the transistor Q1 decreases.

More specifically, when the output voltage Vo falls down to the second threshold voltage Vth2, the controller portion 2 turns the switch SW4 on, and thereafter, when the output voltage Vo falls further down to a third threshold voltage Vth 3 lower than the second threshold voltage Vth2, the controller portion 2 turns the switch SW5 on.

In this way, while the level of the output voltage Vo is monitored, the number of the transistors Q1a to Q1c that are driven is increased stepwise, that is, the on-state resistance of the transistor Q1 is reduced stepwise. With this configuration, it is possible to reduce the maximum level of the current through the charge pump circuit without changing the characteristics thereof in normal operation.

The invention may be practiced otherwise than specifically described above as an embodiment, with many modifications and variations made within the spirit of the invention.

Figure 7:
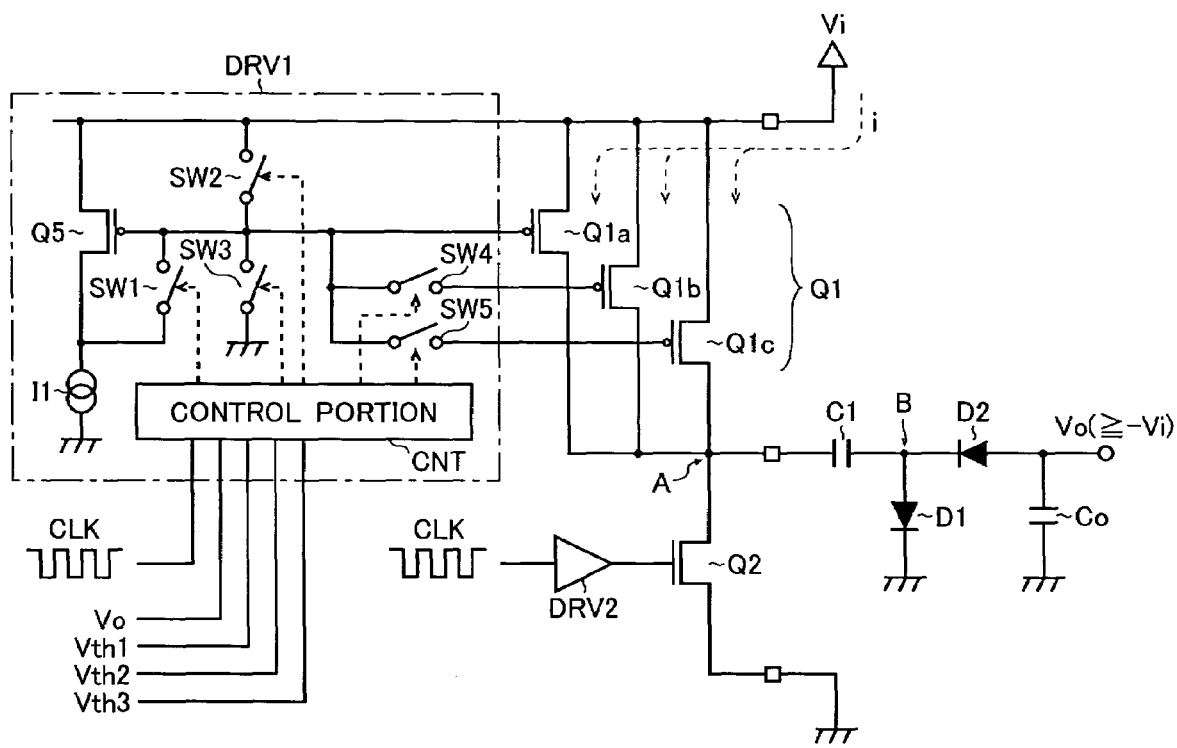
FIG. 7 is a circuit diagram of a charge pump circuit as a fifth embodiment of the invention.

For example, as shown in FIG. 7, the transistors Q3 and Q4 may be replaced with diodes D1 and D2 (a fifth embodiment).

Figure 8:
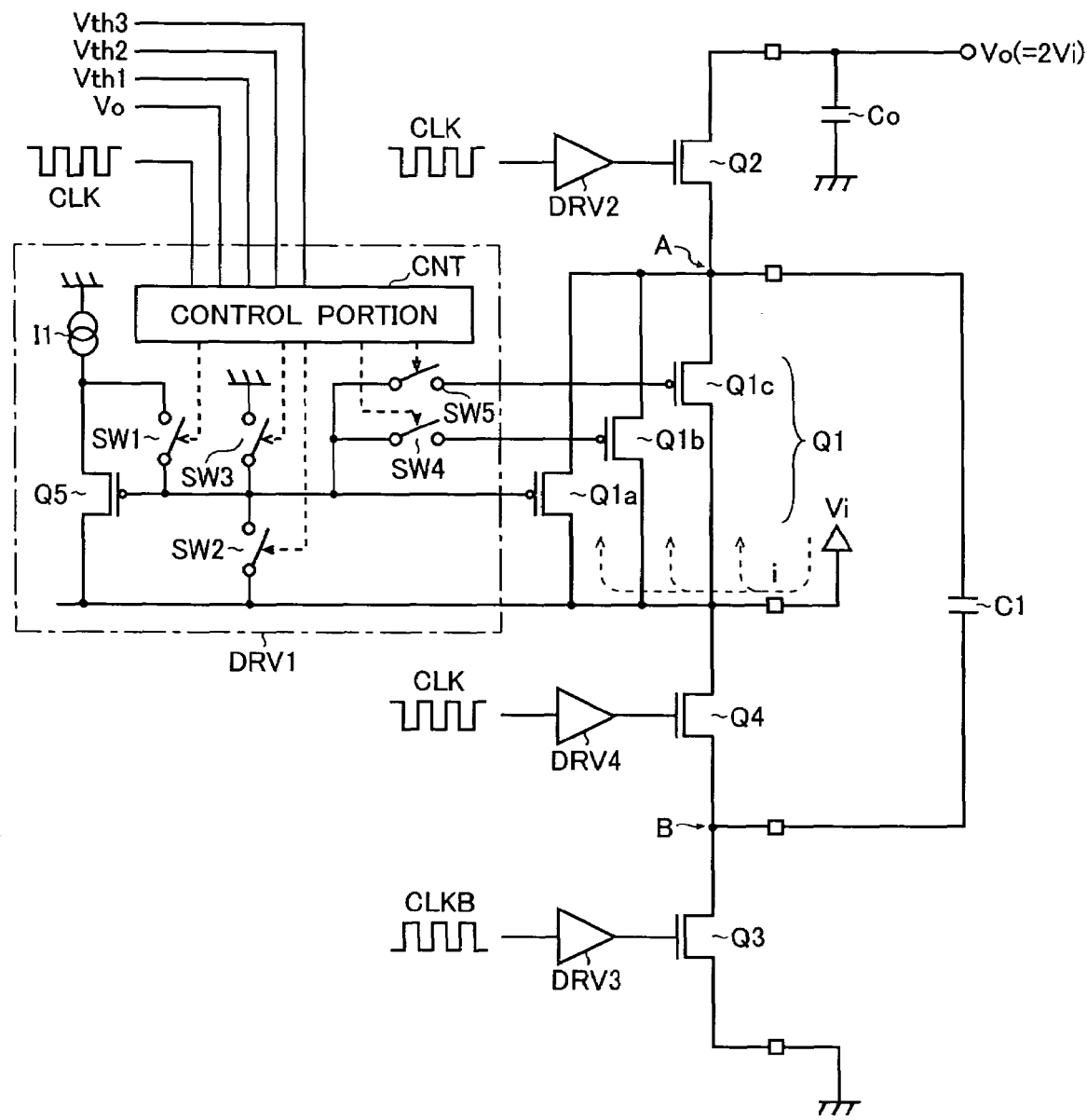
FIG. 8 is a circuit diagram of a charge pump circuit as a sixth embodiment of the invention.
Figure 9:
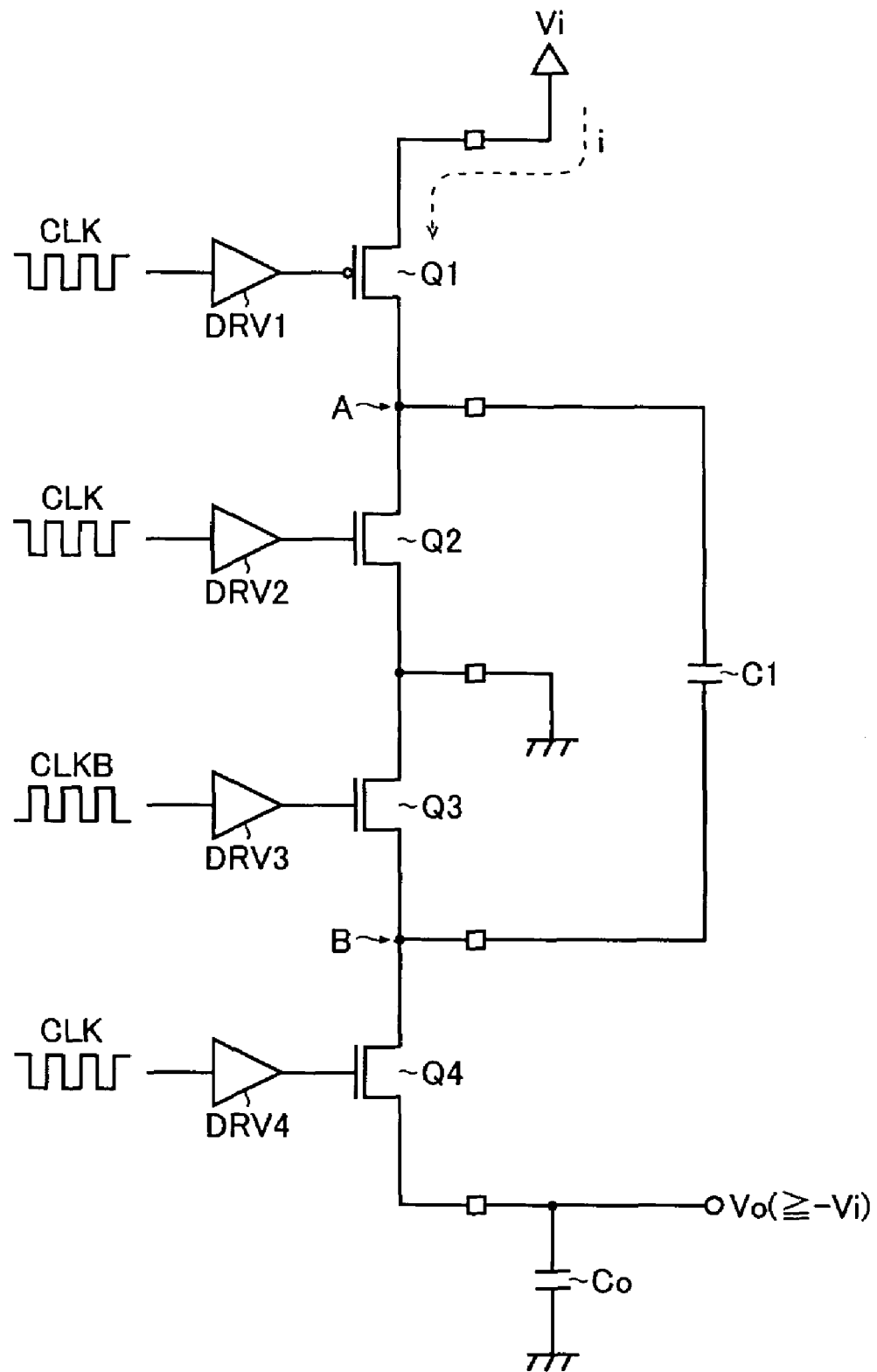
FIG. 9 is a circuit diagram of an example of a conventional charge pump circuit.
Figure 10:
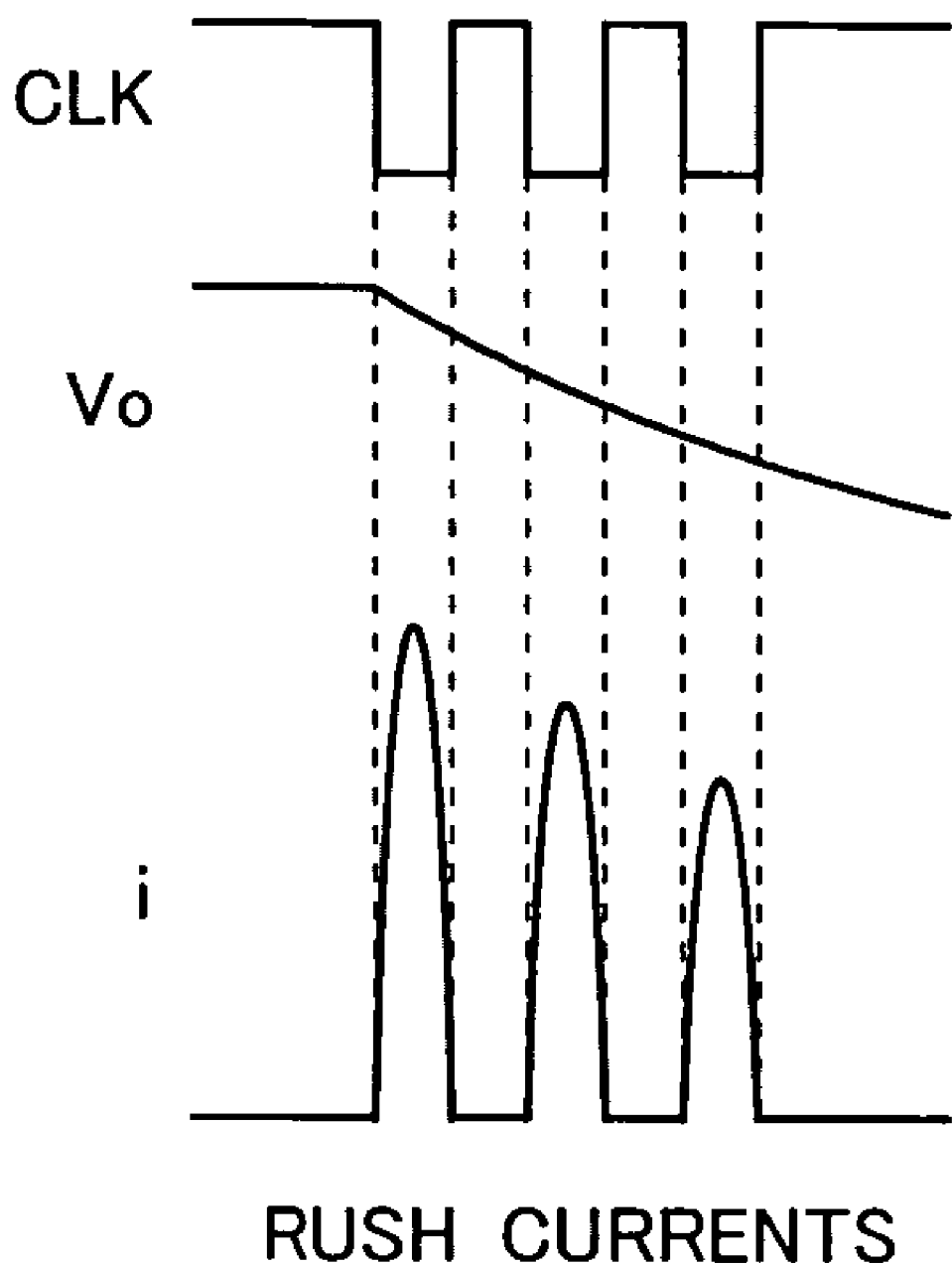
FIG. 10 is a diagram showing how rush currents occur.

The embodiment described above deals with a case where the invention is applied to a negative-voltage-output charge pump circuit. The invention, however, may be applied to any other configuration, for example to a positive step-up charge pump circuit (a sixth embodiment) as shown in FIG. 8.

As described above, with a charge pump circuit according to the present invention, it is possible to alleviate rush currents that occur at start-up, and this can be achieved without lowering efficiency. Thus, there is no need to unduly increase the current capacity of charge transfer transistors, and this makes chip area reduction possible. Moreover, with a charge pump circuit according to the present invention, a margin can be secured in, for example, latch-up characteristics with large current, and this widens the choice of feasible fabrication processes. Moreover, incorporating a charge pump circuit according to the present invention in an electric appliance helps enhance its operation stability at start-up.

Thus, the present invention proves to be useful in preventing rush currents in a charge pump circuit.

What is claimed is:

1. A charge pump circuit comprising:
   a plurality of charge transfer transistors that are turned on and off periodically according to a clock signal;
   a charge accumulation capacitor that is charged and discharged as the charge transfer transistors are turned on and off so as to produce a desired output voltage from an input voltage;
   a slew rate changer portion that changes a slew rate at which the clock signal is fed to the charge transfer transistors; and
   a controller portion that controls the slew rate changer portion to change the slew rate according to a level of the output voltage,
   wherein the controller portion gives instructions to the slew rate changer portion to increase the slew rate as the output voltage approaches a target voltage level.

2. The charge pump circuit according to claim 1,
   wherein the slew rate changer portion has, connected to a clock signal input terminal of each of the charge transfer transistors, a respective variable resistance portion whose resistance is varied according to the instructions from the controller portion.

3. The charge pump circuit according to claim 2,
wherein each of the variable resistance portions has, connected in parallel with one another, a plurality of serial circuits each composed of a resistor and a switch, the switch being opened and closed according to the instructions from the controller portion.

4. An electric appliance including a charge pump circuit, the charge pump circuit comprising:
   a plurality of charge transfer transistors that are turned on and off periodically according to a clock signal;
   a charge accumulation capacitor that is charged and discharged as the charge transfer transistors are turned on and off so as to produce a desired output voltage from an input voltage;
   a slew rate changer portion that changes a slew rate at which the clock signal is fed to the charge transfer transistors; and
   a controller portion that controls the slew rate changer portion to change the slew rate according to a level of the output voltage,
wherein the controller portion gives instructions to the slew rate changer portion to increase the slew rate as the output voltage approaches a target voltage level.

5. The electric appliance according to claim 4,
wherein the slew rate changer portion has, connected to a clock signal input terminal of each of the charge transfer transistors, a respective variable resistance portion whose resistance is varied according to the instructions from the controller portion.

6. The electric appliance according to claim 5,
wherein each of the variable resistance portions has, connected in parallel with one another, a plurality of serial circuits each composed of a resistor and a switch, the switch being opened and closed according to the instructions from the controller portion.

* * * * *